United States Patent [19]

Oliver

[11] Patent Number: 4,625,612

[45] Date of Patent: Dec. 2, 1986

[54] ROTARY PORTAPUNCH ASSEMBLY

[75] Inventor: Robert J. L. Oliver, Huntington Beach, Calif.

[73] Assignee: Riccobin & Martin, Santa Fe Springs, Calif.

[21] Appl. No.: 779,070

[22] Filed: Sep. 23, 1985

[51] Int. Cl.$^4$ .......................... A21C 11/00; B26D 3/08
[52] U.S. Cl. ........................................ 83/863; 83/346; 83/678
[58] Field of Search ................. 83/346, 347, 862, 863, 83/678

[56]          References Cited

U.S. PATENT DOCUMENTS

| | | | |
|---|---|---|---|
| 2,181,235 | 11/1939 | Hurrell | 184/3 |
| 2,195,849 | 4/1940 | Carroll | 164/68 |
| 2,220,489 | 11/1940 | Lowkrantz | 175/183 |
| 2,228,786 | 1/1941 | Stoner | 15/25 |
| 2,294,718 | 9/1942 | Carroll | 93/93 |
| 2,521,370 | 9/1950 | Holmwood et al. | 164/48 |
| 2,628,681 | 2/1953 | Kane | 164/99 |
| 2,693,277 | 11/1954 | Wagner et al. | 209/74 |
| 3,209,630 | 10/1965 | McCartan | 83/346 X |
| 3,720,126 | 3/1973 | Kranz | 83/346 X |
| 3,823,633 | 7/1974 | Ross | 83/346 |
| 3,880,030 | 4/1975 | Rosengren | 83/863 |
| 3,965,786 | 6/1976 | D'Luhy | 83/346 |
| 3,981,213 | 9/1976 | Lopman | 83/346 |
| 4,167,130 | 9/1979 | Miller | 83/678 X |
| 4,248,117 | 2/1981 | Bugnone | 83/863 |
| 4,276,800 | 7/1981 | Koppa et al. | 83/863 |
| 4,455,903 | 6/1984 | Kesten | 83/346 |

Primary Examiner—Horace M. Culver

[57] ABSTRACT

A rotary press mechanism is disclosed, including a die roller and a cooperating anvil roller. The anvil roller is formed to have an annular outer surface. The die roller is formed to have an annular outer surface portion and a cutting die formed on the die roller surface. The cutting die is formed of a pattern of substantially identical cutting elements shaped to substantially outline a rectangular area. The cutting die elements include cutting edge portions extending from the annular outer surface portions of the die roller a distance substantially equal to the distance between the annular outer surface portions of the die roller and anvil roller. The die elements may also include relief portions, disposed intermediate said cutting edge portions along the rectangular outline. The relief portions may be flush with the annular outer surface portion of the die roller, or may extend from the die roller annular outer surface portion a shorter distance than the die element cutting edge portion. The die roller and the anvil roller cooperate to outline and substantially cut a pattern of punches on the tabulation cards passing therethrough. The punches are readily removeable from the tabulation card upon the application of pressure.

14 Claims, 6 Drawing Figures

U.S. Patent  Dec. 2, 1986  4,625,612
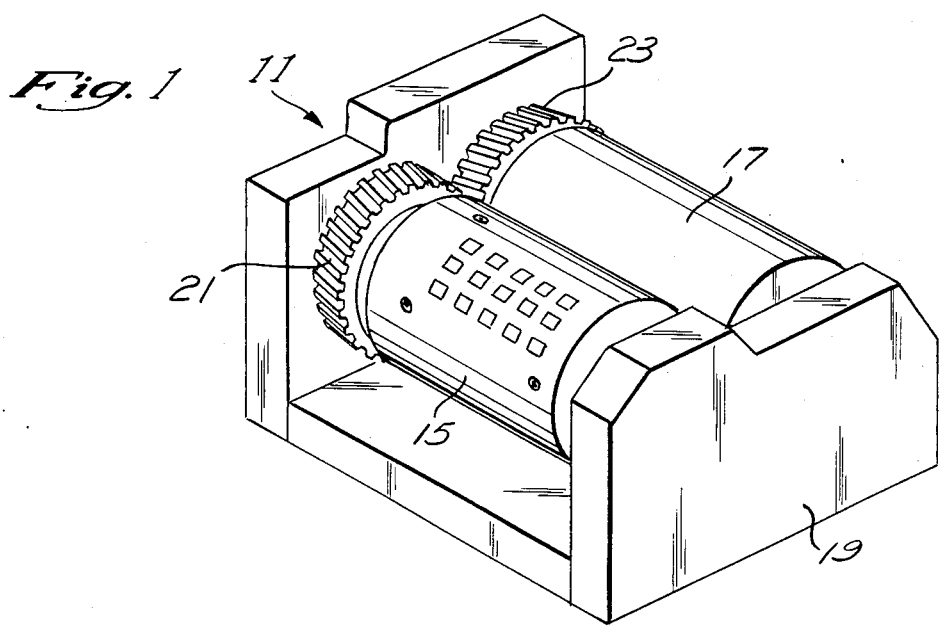
Fig. 1
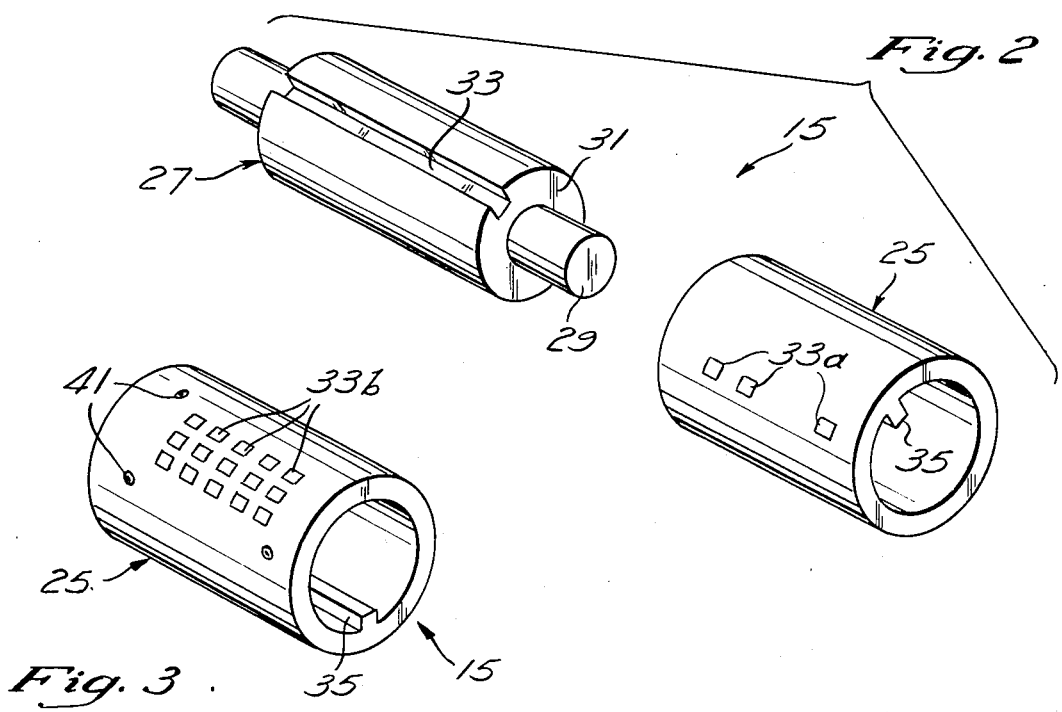
Fig. 2
Fig. 3
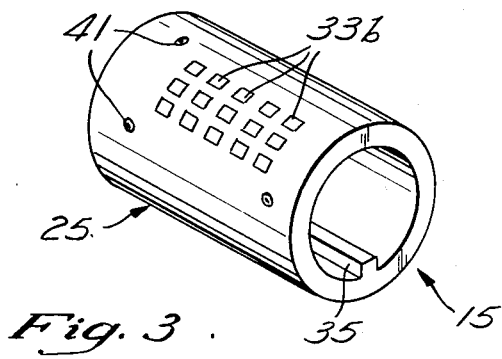
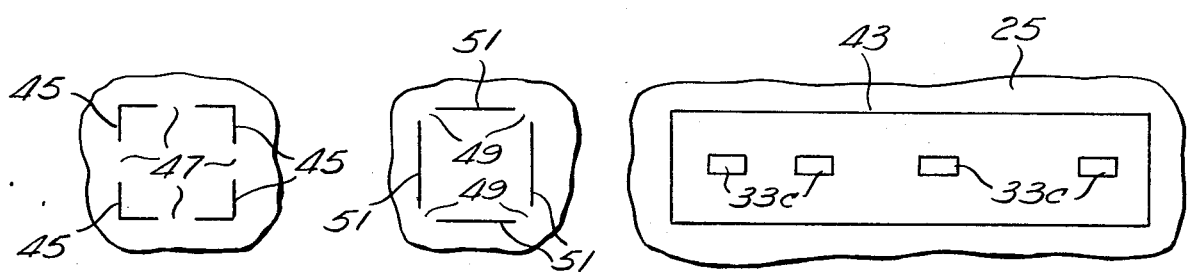
Fig. 4   Fig. 5   Fig. 6

ROTARY PORTAPUNCH ASSEMBLY

BACKGROUND OF THE INVENTION

The present invention relates generally to rotary die cutting apparatus, and, more particularly, to rotary die cutting apparatus for forming computer readable punchout tabulation cards.

Punchout tabulation cards as those formed by the present invention are similar to normal computer tabulation cards, with the exception that the punchout cards include a pattern of substantially identical punchout areas that may be displaced from the card upon the application of pressure, i.e., being pressed on with a pencil point. Each punch, or punchout area, is typically formed as a substantially rectangular pattern cut through the thickness of the tabulation card. The cut, however, does not completely outline the punch area and is interrupted by short, uncut portions that serve as anchors to keep the punch in place until pressure is applied. After one or more of the punches has been displaced, the card is typically inserted into an optical data scanner, to interpret the information represented by displacement of the particular punch.

A number of devices have heretofore been used for cutting rolls of sheet paper to form computer readable tabulation cards. Those devices may also be operative to perform such functions as printing the desired material on the face of the sheet, cutting the sheet into cards, cutting or rounding corners of the cards, ejecting defective cards and stacking acceptable cards.

Contemporary mechanisms for punching hole patterns in tabulation cards utilize either rotary punch mechanisms or flat press mechanisms. The rotary punching mechanisms include a male rotary cutting die and a cooperating female or anvil roller. Contemporary die rollers for card punching operations are typically comprised of a pattern of adjustable die elements that can be extended a variable distance from the die roller outer surface. Contemporary anvil rollers for card punching operations are comprised of a similar pattern of elements that can be retracted inwardly from the outer surface of the anvil roller to receive the male counterpart on the die roller. Thus, tabulation cards passing between the die roller and anvil roller abut against the extending die roller elements and are urged against the cooperating anvil roller cavity until the card is punched and the punch withdrawn by a vacuum source connected to the interior of the anvil roller.

Such contemporary mechanisms are unsuitable for use in the formation of punchout cards, in that the area defined by the die cutting elements is totally removed from the card. Moreover, such mechanisms do not readily lend themselves to modification to form punchout cards. For example, the male die cutting elements for those contemporary mechanisms must be sufficiently small and short so as not to break off when the die cutting element engages the recesses in the rotating anvil roller. Additionally, because the upper surface of the die cutting elements is typically smooth and flat to permit the cutting element to be flush with the surface of the roller when the element is withdrawn, the die cutting elements do not cleanly cut through the tabulation card when the corresponding anvil element is disposed flush with the outer surface of the anvil roller. When the anvil element is withdrawn from the surface of the roller, the mechanism tends to completely separate the punched area from the card.

At present, mechanisms for fabricating punchout tabulation cards, known as portapunches, have been limited to flatbed presses. Though flatbed presses are adequate to properly form punchout areas on the tabulation cards, they operate too slowly, i.e., approximately 5,000 cards an hour. Accordingly, it has been difficult to use those presses to profitably manufacture punchout tabulation cards, in view of that limited production rate and the costs of the press mechanism.

Accordingly, it is a principal object of the present invention to provide a rotary mechanism for producing punchout tabulation cards that far exceeds the operating rate of similarly operative contemporary mechanisms.

It is also an object of the present invention to provide a rotary mechanism for producing punchout tabulation cards that can be readily modified to form different punchout patterns on the card by changing only one of the cooperating rollers.

It is a further object of the invention to provide a rotary mechanism for fabricating punchout tabulation cards wherein the movement of the rollers need not be synchronized.

SUMMARY OF THE INVENTION

These and other objects and advantages of the present invention are achieved in a rotary press mechanism having a die roller and a cooperating anvil roller. The anvil roller is formed to have an annular outer surface. The die roller is formed to have an annular outer surface portion with a cutting die formed on a portion of the die roller surface. The cutting die is preferably formed of a pattern of substantially identical cutting elements shaped to substantially outline a rectangular area. The cutting die elements include cutting edge portions extending from the annular outer surface portions of the die roller a distance substantially equal to the distance between the annular outer surface portions of the die roller and anvil roller. The die elements may also include relief portions disposed intermediate said cutting edge portions along the rectangular outline. The relief portions may be flush with the annular outer surface portion of the die roller, or may extend from the die roller annular outer surface portion a shorter distance than the die element cutting edge portion. The die roller and the anvil roller cooperate to outline and substantially cut a pattern of punches on the tabulation cards passing therethrough. The punches are readily removeable from the tabulation card upon the application of pressure.

BRIEF DESCRIPTION OF THE DRAWINGS

FIG. 1 is a perspective view of a rotary press mechanism formed in accordance with the present invention;

FIG. 2 is an assembly drawing of a die roller assembly formed in accordance with the present invention;

FIG. 3 is an assembly drawing of an alternate embodiment of the sleeve portion of the die roller assembly;

FIG. 4 is a top view of an individual die element;

FIG. 5 is a top view of an alternate embodiment of an individual die element; and FIG. 6 is a top view of a plate for mounting the die cutting elements onto the die roller.

DETAILED DESCRIPTION OF THE PRESENTLY PREFERRED EMBODIMENT

FIG. 1 illustrates a rotary press assembly 11 formed in accordance with the present invention. As shown therein, assembly 11 includes a die roller 15 and an anvil roller 17. Both rollers are rotatably mounted within a housing 19, and cooperate to turn in unison through the action of gears 21 and 23.

The presently preferred embodiment of the invention is constructed to operate in conjunction with contemporary mechanisms useful to cut and print tabulation cards. Such mechanisms are well known in the art and are described, for example, in U.S. Pat. No. 2,195,849 for Cutting Means. It is to be understood, however, that the invention may be modified for use in conjunction with various other types of rotary mechanisms.

Different views of die roller 15 illustrated at FIGS. 2 and 3. As shown therein, die roller 15 is adapted for rotatable mounting within housing 19. Sleeve 25 is preferably provided with set screws 41 to maintain the sleeve 25 in place along the length of die roller body 27. The die roller body 27 includes a die roller shaft portion 29 and a die roller collar portion 31. The collar portion 31 includes slot 33 adapted to receive rib 35 on the inner surface of sleeve 25. On another embodiment (not shown) sleeve 25 and die roller 27 are formed to be an integral solid element rather than two separate pieces. In such a construction the combined cylindrical element may be machined from a single piece of metal.

Referring again to FIGS. 2 and 3, Sleeve 25 may be formed to have different patterns of cutting die elements 33 formed on the outer surface thereof. As shown at FIG. 2, cutting die elements 33a may be fabricated as a linear pattern of substantially identical cutting elements formed on the outer surface of sleeve 25 and extending radially outwardly therefrom. As shown at FIG. 3, cutting die elements 33b may be formed as a planer pattern of similar cutting die elements formed on the outer surface of sleeve 25.

The height of the cutting die elements, and the spacing between the outer annular surface of the die roller and anvil roller are typically selected in accordance with factors such as the thickness of the materials passing between the rollers and the speed of the rollers. Computer cards are typically fabricated to be approximately 0.007 inches thick. To accommodate such cards, the outer annular surfaces of the die roller and anvil roller are disposed approximately 0.006 inches apart in the presently preferred embodiment. The height of individual die elements 33 is substantially equal to and preferably slightly greater than the 0.006 inches spacing between the rollers in order to effect a slight interference between the die cutting elements and the anvil roller to facilitate cutting the card. The cutting die elements are preferably formed to be substantially hollow, i.e., no flat upper portion, with voids or depressions interrupting the cutting edge portions. It will be recognized that the roller speed and roller wobble will also affect the interference between the die cutting elements and the anvil roller and, therefore, affect the desired height of the die cutting elements from the surface of the die cutting roller.

In order to change the cutting pattern formed on the tabulation card, it is only necessary to remove the sleeve 25 from the roller 29 and replace it with a different sleeve having another pattern of die cutting elements formed thereon. Sleeve 25 may be formed by various processes. In one process, the sleeve 25 is formed by mill grinding a work piece having an outer diameter conforming to the uppermost portion of the die elements. The work piece may then be ground to a diameter corresponding to the annular surface portion of the die cutting sleeve 25, leaving the die cutting elements at their original diameter, or height.

Alternatively, the die cutting elements may be singly or collectively soldered or welded to the surface of the die cutting roller 25. In a still further variation illustrated at FIG. 6, the die cutting elements 33(c) may also be preformed on a plate 43, which in turn is mounted to the external surface of sleeve 25 by any convenient means, such as welding or by means of set screws. In that embodiment, the punch pattern on sleeve 25 may be modified by removing the plate 43 and replacing it with a different plate having another pattern of die cutting elements formed thereon.

FIGS. 4 and 5 illustrate different designs of individual die cutting elements. It is recognized, however, that other cutting element designs, e.g., circles or stars, may be utilized within the scope of the present invention. In the embodiment, shown at FIG. 4, the die cutting elements include cutting edge portions 45 forming corner sections of the punch pattern. Relief portions 47, between corner sections 45, may be ground down part of the way, or all of the way, to the annular outer surface of the sleeve 25, so as to avoid cutting through the tabulation card in those areas. Relief portions 47 serve to facilitate the retention of the punch area within the tabulation card until the punch area is depressed by the aplication of pressure, e.g., when the user presses down on the particular punch with a pencil point or the like. Where relief portions 47 are only slightly depressed from the height of the cutting edge portion 33, the portions 45 serve to crease the underlying area of the tabulation card effecting a cut and/or crease pattern entirely about the outline of the punchout area, without completely cutting the punchout area.

FIG. 5 illustrates an alternative die cutting element design wherein the uncut areas define the corner or relief portions 49 of the punch area, and the cutting edge portions 51 of the element is disposed along the sides of the punch outline. Again, relief portions 49 may be of a sufficient height to crease the punch card in that area, or may be depressed from the upper surface of cutting edge portions 51, a sufficient distance so as to not score the punch card at all in the underlying area.

It is also anticipated that in a further embodiment the cutting edge portion 43 may extend about the entire perimeter of the punch area, but be of a reduced height so that the die cutting elements generally do not completely penetrate the punch area, at any point along the rectangular outline. Again, the punch remains in place until subsequent depression when the card is used.

In the presently preferred embodiment the housing 19 is constructed to be approximately six and one quarter inches (6¼") long, four and three quarter inches (4¾") wide, and three and one quarter inches (3¼") high. The anvil roller 17 is constructed of tooled steel approximately four and one quarter inches (4¼") long and having a smooth outer surface with a radius of approximately two and one quarter (2¼") inches. The die roller collar portion 31 is constructed to be approximately four and one quarter inches (4¼") long, having an outer radius of approximately one and one half inches (1½"). The die roller sleeve 25 is formed to have a length of approximately three and one quarter inches (3¼")

inches, with an outer radius of two and one quarter inches (2¼"), and an inner radius of one and one half inches (1½").

As described above, the foregoing description represents only the presently preferred embodiment of the invention. Various modifications and additions may be made to the invention without departing from the spirit or scope of the invention, which is intended to be limited only by the scope of the appended claims.

What is claimed is:

1. A rotary portapunch assembly for forming incomplete punches in tabulation cards comprising:
a housing;
an anvil roller rotatably mounted within said housing, said anvil roller comprising an annular outer surface portion;
a die roller rotatably mounted within said housing, said die roller comprising an annular outer surface portion and a cutting die, said cutting die being formed on said die roller annular outer surface portion and extending outwardly therebeyond, said cutting die comprising a plurality of substantially identical cutting die elements, said elements including cutting edge portions and relief portions, said cutting edge portions extending from said die roller annular outer surface portion a distance substantially equal to the distance between said die roller annular outer surface portion and said anvil roller annular outer surface portion, said relief portions extending from said die roller annular outer surface portion a distance less than the distance between said die roller annular outer surface portion and said anvil roller annular outer surface portion;
said die roller and said anvil roller cooperating to crease and substantially cut a pattern of substantially identical punches on tabulation cards passing therebetween, said punches being readily removable from said card upon the application of pressure to said punches.

2. The assembly as recited in claim 1 wherein said relief portion is effective to crease, without cutting, a portion of said tabulation cards passing between said die roller and said anvil roller.

3. The assembly as recited in claim 1 wherein said cutting edge portions extend from said die roller annular outer surface a distance slightly greater than the distance between said die roller annular outer surface portion and said anvil roller annular outer surface portion.

4. The assembly as recited in claim 1 further including a die roller plate detachably mounted to said die roller, said die roller plate supporting said cutting die elements on said die roller.

5. The assembly as recited in claim 1 wherein said cutting die elements are welded onto the die roller annular outer surface portion.

6. The assembly as recited in claim 1 wherein the tabulation card is approximately 0.007 inches thick.

7. The assembly as recited in claim 1 wherein the die element cutting edge portion extends approximately 0.006 from said die roller annular outer surface portion.

8. The assembly as recited in claim 1 wherein the distance between said die roller annular outer portion and said anvil roller annular outer portion is approximately 0.006.

9. The assembly as recited in claim 1 wherein said cutting edge portions comprise rectangular corner sections of said die elements and said relief portions comprise sections intermediate said corner section along the sides of said cutting die elements.

10. The assembly as recited in claim 1 wherein said cutting edge portions comprise sections along the sides of said die elements and said relief portions comprise rectangular corner sections of said die elements connecting said cutting edge portions.

11. The assembly as recited in claim 1 wherein said cutting edge portions extend from said die roller annular outer surface portion a distance slightly greater than the distance between said die roller annular outer surface portion and said anvil roller annular outer surface portion.

12. A rotary portapunch assembly for forming incomplete punches in tabulation cards comprising:
a housing;
an anvil roller rotatably mounted within said housing, said anvil roller comprising an annular outer surface portion;
a die roller rotatably mounted within said housing, said die roller comprising an annular outer surface portion, a die collar disposed about said die roller annular outer surface portion and the cutting die, said cutting die being formed on the outer surface of said die collar and extending outwardly therebeyond, said cutting die comprising a plurality of substantially identical cutting die elements, said elements including cutting edge portions and creasing edge portions, said cutting edge portions extending from said die collar outer surface a distance substantially equal to the distance between said die roller collar outer surface and said anvil roller annular outer surface portion, said creasing edge portion extending from said die collar outer surface a distance less than the distance between said die collar outer surface and said anvil roller annular outer surface portion;
said die roller and said anvil roller cooperating to crease and substantially outline a pattern of substantially identical punches on tabulation cards passing therebetween, said punches being readily removeable from said card upon the application of pressure to said punches.

13. A rotary portapunch assembly for forming incomplete punches in tabulation cards comprising:
a housing;
an anvil roller rotatably mounted within said housing, said anvil roller comprising an annular outer surface portion;
a die roller rotatably mounted within said housing, said die roller comprising an annular outer surface portion and a cutting die, said cutting die being formed on said die roller annular outer surface portion and extending outwardly therebeyond, said cutting die comprising a plurality of substantially identical cutting die elements, said elements including cutting edge portions and relief portions, said cutting edge portions extending from said die roller annular outer surface portion a distance substantially equal to the distance between said die roller annular outer surface portion and said anvil roller annular outer surface portion, said relief portion extending intermediate said cutting edge portions, and complementing said cutting edge portions to form an outline of the area to be punched;
said die roller and said anvil roller cooperating to substantially cut a pattern of substantially identical punches on tabulation cards passing therebetween, said punches being readily removeable from said card upon the application of pressure to said punches.

14. A rotary portapunch assembly for forming incomplete punches in tabulation cards comprising:
   a housing;
   an anvil roller rotatably mounted within said housing, said anvil roller comprising an annular outer surface portion;
   a die roller rotatably mounted within said housing, said die roller comprising an annular outer surface portion, a die collar disposed about said die roller annular outer surface portion, and the cutting die, said cutting die being formed on the outer surface of said die collar, and extending outwardly therebeyond, said cutting die comprising a plurality of substantially identical cutting die elements, said elements including cutting edge portions and relief portions, said cutting edge portions extending from said die collar outer surface a distance substantially equal to the distance between said die roller collar outer surface and said anvil roller annular outer surface portion, said relief portion extending intermediate said cutting edge portions, and complementing said cutting edge portions to form an outline of the area to be punched; said die roller and said anvil roller cooperating to substantially cut a pattern of substantially identical punches on tabulation cards passing therebetween, said punches being readily removeable from said card upon the application of pressure to said punches;
   said die roller and said anvil roller cooperating to crease and substantially outline a pattern of substantially identical punches on tabulation cards passing therebetween, said punches being readily removeable from said card upon the application of pressure to said punches.

* * * * *